(12) United States Patent
Junkers

(10) Patent No.: US 6,254,322 B1
(45) Date of Patent: *Jul. 3, 2001

(54) BOLT WITH A BOLT MEMBER, A WASHER AND A SLEEVE FOR APPLYING FORCES TO THE BOLT MEMBER AND THE SLEEVE

(76) Inventor: John K. Junkers, 7 Arrowhead La., Saddle River, NJ (US) 07540

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/033,790

(22) Filed: Mar. 3, 1998

(51) Int. Cl.⁷ ............................. F16B 37/08; F16B 23/00
(52) U.S. Cl. ..................... 411/14.5; 411/916; 411/397; 411/432
(58) Field of Search ................................ 411/916, 917, 411/534, 432, 428, 397, 14.5

(56) References Cited

U.S. PATENT DOCUMENTS

| 641,319 | * | 1/1900 | Parbel . |
| 1,333,707 | * | 3/1920 | Dies . |
| 1,769,705 | * | 7/1930 | McGee . |
| 2,292,446 | * | 8/1942 | Huck . |
| 4,433,578 | * | 2/1984 | Hill . |
| 4,622,730 | | 11/1986 | Steinbock . |
| 5,318,397 | | 6/1994 | Junkers . |
| 5,406,867 | | 4/1995 | Junkers . |
| 5,533,852 | * | 7/1996 | Matthews ............................ 411/428 |
| 5,609,454 | | 3/1997 | Lee . |
| 5,622,465 | | 4/1997 | Junkers . |

FOREIGN PATENT DOCUMENTS

| 298 09 229 U1 | 3/1999 | (DE) . |
| 2 564 767 | 11/1985 | (FR) . |
| 351090 | * 8/1937 | (IT) ........................................ 81/55 |

* cited by examiner

Primary Examiner—Flemming Saether
(74) Attorney, Agent, or Firm—Michael J. Striker

(57) ABSTRACT

A bolt for connection two parts with one another has a bolt member having an axis, a threaded portion provided with a thread, and another portion having a polygonal circumference, a friction member connected to the polygonal circumference of the other portion of the bolt member and having a first facial area adapted to abut against a facial area of one of the parts, and also having an opposite second facial area, and a sleeve connectable to the thread of the threaded portion of the bolt member and having a facial area abutting against the second facial area of the friction washer, so that when a given force is applied in one direction to the bolt member and a given force is applied in an opposite direction to the sleeve, only the sleeve turns while the bolt member is elongated or relaxed.

6 Claims, 1 Drawing Sheet

BOLT WITH A BOLT MEMBER, A WASHER AND A SLEEVE FOR APPLYING FORCES TO THE BOLT MEMBER AND THE SLEEVE

BACKGROUND OF THE INVENTION

The present invention relates generally to threaded connectors for connecting two parts with one another.

Threaded connectors of this type are known in the art. Some known threaded connectors are formed as threaded bolts with or without a head, and with or without a nut. One of the threaded connectors is disclosed for example in my U.S. Pat. No. 5,318,397 as well as in my other patents. The bolts or threaded connectors can be further improved.

SUMMARY OF THE INVENTION

Accordingly, it is an object of present invention to provide a new bolt which is a further improvement of the existing bolts.

In keeping with these objects and with others which will become apparent hereinafter, one feature of present invention resides, briefly stated, in a bolt having an axis and used to connect two parts with one another, which has a threaded portion on one of its ends, and another portion axially spaced from the threaded portion and having a polygonal circumference, a friction washer connectable to the polygonal circumference and adapted to rest with a first facial area on one facial area of one of the parts to be connected, and a sleeve connectable to a thread of the threaded portion and abutting with one of its facial areas against a second facial area of the friction washer, so that when a force in one direction is applied to the bolt and a force in an opposite direction is applied to the sleeve, only the sleeve turns while the bolt is elongated or relaxed.

When the bolt is designed in accordance with the present invention, it has a simple construction and can be elongated and relaxed when needed.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawing is a view showing a bolt for connecting two parts with one another in accordance with the present invention.

DESCRIPTION OF PREFERRED EMBODIMENTS

Figure 1:
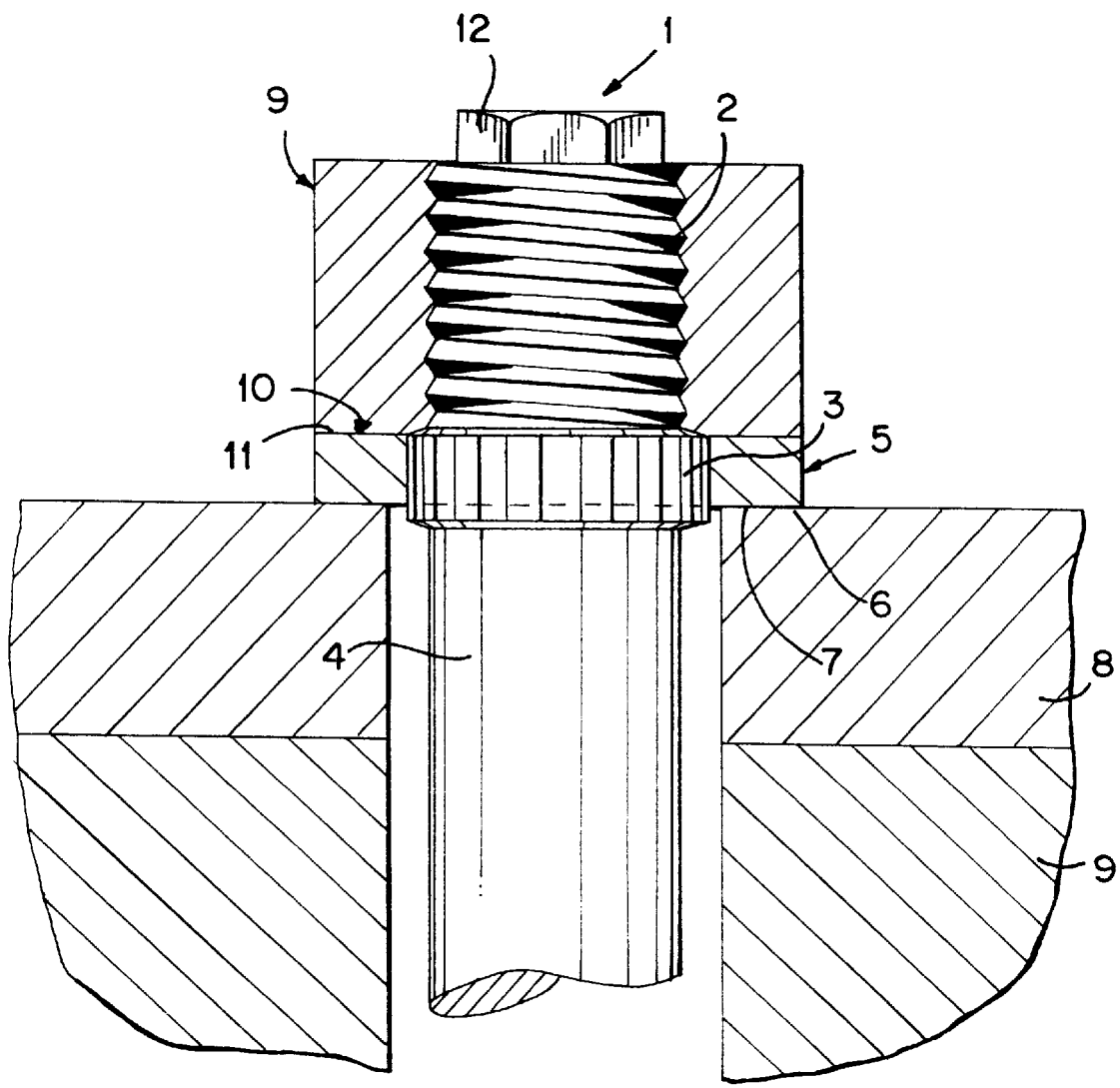

A bolt in accordance with present invention has a bolt member which is identified as a whole with reference numeral 1 and has an axis. The bolt member 1 has a threaded portion 2 located substantially at one end of the bolt member and provided with a thread. The bolt member 1 further has another portion which is identified with reference numeral 3 and has a polygonal circumference. The polygonal circumference bolt portion 3 is axially spaced from the threaded bolt portion 2. Finally, the bolt member 1 has a shaft portion 4 which can be provided with a not shown head on an opposite side. The polygonal circumference of the bolt portion 4 can be formed by a plurality of splines which extend in the axial direction of the bolt member and are spaced from one another in a peripheral direction of the bolt member 1.

The bolt further has a friction washer which is identified as a whole with reference numeral 5. The friction washer has a first facial area 6 which abuts against a facial area 7 of one of the parts to be connected with one another. The parts to be connected with one another are identified with reference numerals 8 and 9. The friction washer 5 is connectable with the polygonal circumference of the bolt portion 3. In particular, the friction washer 5 has an inner surface having a shape corresponding to the shape of the outer surface of the bolt portion 3. In the shown embodiment, the inner surface of the friction washer 5 is provided with a plurality of splines which correspond to the splines of the bolt portion 3 and engage with these splines. Therefore, the bolt member 1 can not rotate relative to the friction washer 5, but can displace in an axial direction relative to the friction washer 5.

The bolt further has a sleeve which is identified with reference numeral 9. The sleeve 9 has a facial area 10 which abuts against an opposite facial area 11 of the friction washer 5. The sleeve 9 is connected with the thread of the threaded portion 2 of the bolt member 1. In particular, the sleeve 9 is provided with an inner thread which corresponds to the outer thread of the threaded portion 2 of the bolt member 1, so as to engage the outer thread of the bolt portion 2.

The bolt in accordance with the present invention operates in the following manner:

When a given force is applied in one direction to the bolt member 1 and a given force is applied in an opposite direction to the sleeve 9, only the sleeve 9 turns while the bolt member 1 is elongated or relaxed. The reason is that on the one hand the bolt member can not turn since it is non rotatably fixed by its polygonal circumference portion 3 in the friction washer 5, and on the other hand, the bolt member 1 can not move axially since its outer thread engages with the inner thread of the sleeve 9. Only the elongation or relaxation of the bolt member 1 is performed.

In the shown embodiment, the given force is applied to the bolt member 1 for example by turning it with a tool which engages a polygonal head 12 formed on the upper end of the bolt member 1. The opposite force applied to the sleeve can be just a holding force, or in other words, the sleeve 9 can be held non rotatably by a tool. On the other hand, it is also possible that the opposite force is an active force intended to rotate the sleeve 9 in a circumferential direction which is opposite to the circumferential direction of rotation of the bolt member 1.

It will be understood that each of the elements described above, or two or more together, may also find a useful application in other types of constructions differing from the types described above.

While the invention has been illustrated and described as embodied in bolt, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. A bolt for connecting two parts with one another, comprising a bolt member having an axis and two axial ends, a threaded portion provided with a thread, and another portion having a polygonal circumference; means on one of said axial ends of said bolt member operative for applying a given force for rotation of said bolt member or for holding said bolt member against rotation at said one axial end; a washer non-rotatably connected to said polygonal circumference of said other portion of said bolt member and having a first substantially flat surface facial area adapted to non-positively engageably and relative movably abut against the facial area of one of the part so that the facial area of the one part is not damaged by washer, and also having an opposite second facial area; a sleeve arranged at said one axial ends of said bolt members, said sleeve being non-connected to said washer and connectable to said thread of said threated portion of said bolt member and having a facial area directly abutting against said second facial area of said washer; and means on said sleeve for applying a given force for holding said sleeve against rotation or for rotating said sleeve, so that when a given force is applied through said means of said bolt member at said one axial ends of said bolt member in one direction to said bolt member non-rotatably connected to said for rotating said bolt member or for holding said bolt member against rotation and a given force is applied through said applying means of said sleeve arranged at said axial end of said bolt member in an opposite direction to said sleeve for holding said sleeve against rotation or for rotating said sleeve, only said sleeve turns while said bolt member does not turn and only is elongated or relaxed.

2. A bolt as defined in claim 1, wherein said threaded portion of said bolt member and said other portion of said member provided with said polygonal circumference are axially spaced from one another.

3. A bolt as defined in claim 1, wherein said sleeve has a thread engaging with said thread of said threaded portion of said bolt member.

4. A bolt as defined in claim 3, wherein said thread of said sleeve is an inner thread and said thread of said threaded portion of said bolt member is an outer thread engaging with said inner thread.

5. A bolt as defined in claim 1, and further comprising means for connecting said washer with said polygonal circumference of said other portion of said bolt member and including interengaging splines provided on said washer and on said polygonal circumference of said other portion of said bolt member.

6. A bolt as defined in claim 5, wherein said splines include inner splines provided in said washer and inner splines provided on said polygonal circumference of said other portion of said bolt member and engaging with said inner splines.

* * * * *